Patented Aug. 21, 1928.

1,681,752

UNITED STATES PATENT OFFICE.

HENRY HERMAN STORCH, OF NEW YORK, N. Y., ASSIGNOR TO THE ROESSLER & HASSLACHER CHEMICAL COMPANY, OF NEW YORK, N. Y., A CORPORATION OF NEW YORK.

SYNTHESIS OF METHANOL.

No Drawing. Application filed May 27, 1927. Serial No. 194,855.

This invention relates to the synthesis of methanol from hydrogen and carbon monoxide and specifically has for its object the preparation and use of a catalyst containing copper for the synthesis of methanol from a mixture of hydrogen and carbonmonoxide. In this reaction the gases combine chiefly in accordance with the following equation:

$$2H_2 + CO = CH_3OH$$

I have discovered that specially prepared copper, as described in my copending application, S. N. 191,924, filed May 16, 1927, of which this is a continuation in part, will very advantageously catalyze the above reaction.

My catalysts are characterized by the utilization of copper derived from complex ammonium-copper salts or cuprammonium compounds. I have now further discovered a combination of this copper with magnesium oxide derived from precipitated magnesium hydroxide which is especially suited for the reaction since in its final form it is obtained in hard masses which can be easily granulated and screened to definite size, and which will retain its granular structure in a satisfactory manner during use. This catalyst is remarkably active under combinations of relatively low temperatures and pressures as will be noted below. Use of powdered portions of this catalyst is also easy since it adapts itself to compression to pill form and retains this form satisfactorily throughout the reduction to the active stage and during use.

I prepare this catalyst as follows:

69 parts by weight of magnesium nitrate  were dissolved in 300 parts distilled water. To this solution at room temperature was added slowly, and with agitation, a solution of 43.2 parts of sodium-hydroxide dissolved in 140 parts of water. This resulted in the formation of finely divided magnesium hydroxide in suspension. A second solution was now prepared by dissolving 21.6 parts of cupric nitrate

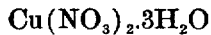

in 140 parts of water and then adding sufficient ammonia to redissolve the precipitate formed by the first ammonia added, and to make the solution slightly alkaline. The mixture of magnesium hydroxide first prepared, was now stirred into the cuprammonium salt solution and the resulting mixture boiled until all the ammonia had been driven off. A black finely divided precipitate was formed which comprises cupric oxide mixed with finely divided magnesium hydroxide. This precipitate was filtered on a suction filter and the cake washed until the wash-waters gave no test for nitrates. This cake was now dried at 150° C. forming black, hard, somewhat brittle lumps consisting of an intimate mixture of magnesium oxide and copper oxide. The lumps were crushed to 10–30 mesh granules. Only about 10% of fines were formed during this crushing.

This mixture was now reduced in a copper lined vessel. The reduction can be carried out by passing hydrogen, or mixtures of hydrogen with carbon monoxide or methanol or both over the heated mass. I prefer to reduce with hydrogen saturated at room temperature with methanol. In order to prevent large uncontrollable increases in temperature during reduction it is usually desirable to dilute the reducing gas with nitrogen or other inert gas. For example a satisfactory mixture would be 3 volumes hydrogen, 2 volumes methanol vapor and 95 volumes nitrogen. This reducing mixture is passed at atmospheric pressure over the dried precipitate preferably contained in a copper lined vessel and heated to not over 350° C. and preferably to about 150–200° C.

After reduction the granules were dark copper colored, and of a hard, firm though brittle structure suited for any methanol synthesis system.

In employing the catalyst for methanol synthesis from hydrogen and carbon monoxide it is desirable to use gases substantially free from the common catalyst poisons which may be present in the raw materials, such as, for example, arsenic, sulphur, phosphorous, volatile iron compounds, or other deleterious constituents gathered during the gas production.

The granular catalyst material was packed in a copper lined high pressure steel bomb and the whole heated to about 300° C. A gas mixture, comprising essentially 4 volumes hydrogen and one volume carbon monoxide, and essentially free of catalyst poisons was now passed through the heated catalyst under a pressure of about 200 atmospheres and at a space velocity per hour (S. V. H.) equivalent to about 5400 cubic feet of gas per cubic foot of catalyst per hour, calculated at normal temperature and pressure. (N. T. P. — 0° C. and 1 atmosphere). During this reaction the temperature of the catalyst mass was about 350° C. A sustained yield of methanol was obtained equivalent to a space time yield (S. T. Y.) of 1000 pounds of methanol per cubic foot of catalyst per 24 hours. The products formed were recovered from the off-gases by cooling while still under pressure. The product was 96–98% methanol. The catalyst retained its granular form after use in the above manner for extended periods of time.

If 30 parts of sodium hydroxide instead of 43.2 parts, as described in the above catalyst preparation, are used a more active form of my catalyst is obtained. Before reduction this has a dark blue-grey color. The preferred method of using the catalyst prepared by this modification is to pulverize the dried material before reduction and then compress this powder into small compact masses of desired form, such as, for example, pills. I have obtained excellent results with pills about one fourth inch in diameter and about one-eighth inch thick. After compression into pills the catalyst is reduced as before and is then ready for use.

The reduced pills were packed in the pressure reaction vessel previously used and the whole heated to about 300° C.; a gas mixture consisting of essentially four volumes of hydrogen and one volume of carbon monoxide under a pressure of about 200 atmospheres was then passed through the heated catalyst at an S. V. H. of about 8000. The catalyst temperature during the reaction was about 360° C. An S. T. Y. of 1600 was obtained; the conversion to methanol being about 48% of the carbon monoxide. Higher S. T. Y's, but with correspondingly lower conversions, are obtained at higher space velocities.

I have found in the course of many experiments with this catalyst that the exact quantities, proportions, etc. given in the preferred examples of catalyst manufacture may be varied, and my catalyst can still be obtained, and I therefore do not wish to be definitely restricted to the examples given. Nor do I wish to be limited in the utilization of this catalyst to the preferred example of methanol manufacture which I have given by way of illustration. This catalyst is of high activity and hence will operate over a large range of varying conditions, all combinations of which need not be given. I have used these catalysts under many conditions and find that wide limits of pressure and temperature are permissible. All the factors such as, temperature, S. V. H., pressure, etc. may be varied in order to secure various S. T. Y's or percent conversions which may be desired because of mechanical and thermal control or for manufacturing economies. The off-gases may be recirculated, after separation of the methanol, with or without replenishment.

This catalyst has also given good results with gas mixtures where the ratio of hydrogen to carbon monoxide was less as well as greater than that given in my preferred example. My catalyst will form methanol from a gas mixture having any ratio of hydrogen to carbon monoxide, but if the ratio is below one to one by volume the S. T. Y. will be considerably lower than that obtained with hydrogen in excess by volume. In general I prefer not to use less hydrogen than that required theoretically by the equation $$2H_2 + CO = CH_3OH$$

I have found that a gas containing about four volumes of hydrogen to each volume of carbon monoxide gives the best results, and that with about 6 volumes of hydrogen the S. T. Y. is somewhat lower. For economic reasons I therefore prefer not to exceed 6 volumes of hydrogen for each volume of carbon monoxide, but I do not wish to be limited to this amount since methanol will be formed with the higher hydrogen ratios.

This catalyst is suited for the above syntheses at temperature ranging between 150° C. and 450° C. although I have found the best results are secured between 300° C. and 400° C. Within the temperature limits given above, methanol will be formed in substantial amounts by this catalyst at pressures of 5 atmospheres and upwards, dependent on the temperature used. Substantial yields of methanol may even be obtained at pressures lower than this; for example, at one atmosphere. Under such conditions, however, the S. T. Y. is in general so much lower that the process would not be economical. In general, I have found that the best results are secured between 200 and 300 atmospheres, but I do not wish to be limited to this range. The catalyst will form methanol under the pressure and temperature limits given above at any space velocity. Because of economic reasons, however, I prefer space velocities of 200 to 20,000, calculated at N. T. P.

Claims:

1. A catalyst for the production of methanol from hydrogen and carbon monoxide which comprises a mixture of copper and magnesium oxide prepared by precipitating cupric oxide from a cuprammonium salt solution in the presence of precipitated magnesium hydroxide, drying the mixed precipitate and then reducing the cupric oxide to metalic copper in the mixed precipitate.

2. A catalyst for the production of methanol from hydrogen and carbon monoxide which comprises copper formed by reduction of cupric oxide precipitated from a cuprammonium salt solution in intimate admixture with magnesium hydroxide.

3. Process for the production of methanol which comprises passing a gaseous mixture of hydrogen and carbon monoxide containing an excess of hydrogen, under a pressure above atmospheric, in contact with a heated catalyst consisting of copper formed by the reduction of cupric oxide in intimate admixture with magnesium oxide.

4. Process for the production of methanol which comprises passing a gaseous mixture of hydrogen and carbon monoxide containing an excess of hydrogen, under a pressure above atmospheric, in contact with a heated catalyst consisting of copper and magnesium oxide formed by the reduction of cupric oxide precipitated from a cuprammonium salt solution in ultimate admixture with precipitated magnesium hydroxide.

5. Process for the production of methanol which comprises passing a gaseous mixture of hydrogen and carbon monoxide containing an excess of hydrogen, under a pressure of between 5 and 300 atmospheres in contact with a heated catalyst consisting of a mixture of copper and magnesium oxide prepared by precipitating cupric oxide from a cuprammonium salt solution in the presence of precipitated magnesium hydroxide, drying the precipitate and then reducing the cupric oxide to metallic copper in the mixed precipitate, said catalyst being heated to a temperature of between 150° C. and 450° C.

6. Process for the production of methanol which comprises passing a gaseous mixture of hydrogen and carbon monoxide containing an excess of hydrogen, under a pressure of 200 atmospheres in contact with a heated catalyst consisting of a mixture of copper and magnesium oxide prepared by precipitating cupric oxide from a cuprammonium salt solution in the presence of precipitated magnesium hydroxide, drying the precipitate and then reducing the cupric oxide to metallic copper in the mixed precipitate, said catalyst being heated to a temperature of between 300° C. and 400° C.

Signed at Perth Amboy, in the county of Middlesex and State of New Jersey, this 24th day of May, A. D. 1927.

HENRY HERMAN STORCH.

CERTIFICATE OF CORRECTION.

Patent No. 1,681,752.  Granted August 21, 1928, to

HENRY HERMAN STORCH.

It is hereby certified that error appears in the printed specification of the above numbered patent requiring correction as follows: Page 2, line 106, for the word "temperature" read "temperatures", and line 126, for the numeral "200" read "2,000"; and that the said Letters Patent should be read with these corrections therein.that the same may conform to the record of the case in the Patent Office.

Signed and sealed this 9th day of October, A. D. 1928.

(Seal)

M. J. Moore,
Acting Commissioner of Patents.

which comprises a mixture of copper and magnesium oxide prepared by precipitating cupric oxide from a cuprammonium salt solution in the presence of precipitated magnesium hydroxide, drying the mixed precipitate and then reducing the cupric oxide to metalic copper in the mixed precipitate.

2. A catalyst for the production of methanol from hydrogen and carbon monoxide which comprises copper formed by reduction of cupric oxide precipitated from a cuprammonium salt solution in intimate admixture with magnesium hydroxide.

3. Process for the production of methanol which comprises passing a gaseous mixture of hydrogen and carbon monoxide containing an excess of hydrogen, under a pressure above atmospheric, in contact with a heated catalyst consisting of copper formed by the reduction of cupric oxide in intimate admixture with magnesium oxide.

4. Process for the production of methanol which comprises passing a gaseous mixture of hydrogen and carbon monoxide containing an excess of hydrogen, under a pressure above atmospheric, in contact with a heated catalyst consisting of copper and magnesium oxide formed by the reduction of cupric oxide precipitated from a cuprammonium salt solution in ultimate admixture with precipitated magnesium hydroxide.

5. Process for the production of methanol which comprises passing a gaseous mixture of hydrogen and carbon monoxide containing an excess of hydrogen, under a pressure of between 5 and 300 atmospheres in contact with a heated catalyst consisting of a mixture of copper and magnesium oxide prepared by precipitating cupric oxide from a cuprammonium salt solution in the presence of precipitated magnesium hydroxide, drying the precipitate and then reducing the cupric oxide to metallic copper in the mixed precipitate, said catalyst being heated to a temperature of between 150° C. and 450° C.

6. Process for the production of methanol which comprises passing a gaseous mixture of hydrogen and carbon monoxide containing an excess of hydrogen, under a pressure of 200 atmospheres in contact with a heated catalyst consisting of a mixture of copper and magnesium oxide prepared by precipitating cupric oxide from a cuprammonium salt solution in the presence of precipitated magnesium hydroxide, drying the precipitate and then reducing the cupric oxide to metallic copper in the mixed precipitate, said catalyst being heated to a temperature of between 300° C. and 400° C.

Signed at Perth Amboy, in the county of Middlesex and State of New Jersey, this 24th day of May, A. D. 1927.

HENRY HERMAN STORCH.

CERTIFICATE OF CORRECTION.

Patent No. 1,681,752.    Granted August 21, 1928, to

HENRY HERMAN STORCH.

It is hereby certified that error appears in the printed specification of the above numbered patent requiring correction as follows: Page 2, line 106, for the word "temperature" read "temperatures", and line 126, for the numeral "200" read "2,000"; and that the said Letters Patent should be read with these corrections therein.that the same may conform to the record of the case in the Patent Office.

Signed and sealed this 9th day of October, A. D. 1928.

(Seal)

M. J. Moore,
Acting Commissioner of Patents.